United States Patent [19]

Nakamura et al.

[11] Patent Number: 4,658,255

[45] Date of Patent: Apr. 14, 1987

[54] ADAPTIVE RADAR SIGNAL PROCESSING APPARATUS

[75] Inventors: Hiroshi Nakamura; Eiichi Kiuchi; Toshihiko Hagisawa, all of Tokyo, Japan

[73] Assignee: NEC Corporation, Tokyo, Japan

[21] Appl. No.: 633,030

[22] Filed: Jul. 23, 1984

[30] Foreign Application Priority Data

Jul. 21, 1983 [JP] Japan .................. 58-133345

[51] Int. Cl.⁴ ............................................. G01S 13/52
[52] U.S. Cl. ..................................... 342/91; 342/160; 342/159
[58] Field of Search .................... 343/17.1 R, 7.7, 7 A

[56] References Cited

U.S. PATENT DOCUMENTS 4,375,640 3/1983 Harvey ........................... 343/7.7 X Primary Examiner—Thomas H. Tarcza
Assistant Examiner—Mark Hellner
Attorney, Agent, or Firm—Schwartz, Jeffery, Schwaab, Mack, Blumenthal & Evans

[57] ABSTRACT

An adaptive radar signal processing apparatus for a radar system wherein filter coefficients are switched for individual regions so that optimum filter characteristics can be obtained for the individual stationary clutter region, moving clutter region, clear region, etc. thereby providing suppression of undesired signals which is adapted for each region.

3 Claims, 6 Drawing Figures

ADAPTIVE RADAR SIGNAL PROCESSING APPARATUS

BACKGROUND OF THE INVENTION

This invention relates to radar signal processing apparatus and, more particularly, an adaptive radar signal processing apparatus, in which undesired signals are suppressed in an adaptive radar signal processing by switching filter characteristics according to various regions responsible for generation of undesired signals.

Generally, according to the theory of digital filters, the input response of a digital filter having fixed filter coefficients is expressed as $$Y(m) = \sum_{l=1}^{N} W(l) \cdot X(l + m - 1), (l = 1, 2, \ldots, N) \quad (1)$$

were X(l) represents an input signal, W(l) is a filter constant and Y(m) is an output signal. Here, m, l and N are integers, N represents the number of digital filter stages, and the input/output signal and filter coefficients are complex numbers.

FIG. 1 shows the structure of a conventional digital filter. In this case, signals involved are all complex numbers, and arithmetic units are all complex number arithmetic units. Referring to FIG. 1, the circuit illustrated comprises an input terminal 100, memories 111-1, 111-2, ---, 111-(N−1), weighting multipliers 121-1, 121-2, ---, 121-N, filter coefficient application terminals 131-1, 131-2, ---, 131-N, an adder 140 and an output terminal 150. The memories have a memory capacity required to store all reflected signals (digital signals) which are obtained, like radar reception signals, successively for each transmission pulse.

The frequency response characteristics of a digital filter are determined definitely by specifying the filter coefficient (i.e., W(l) in FIG. 1), and various digital filters can be realized which have an MTI (Marring Target Indication) cancellation function and a DFT (Dispersive Fourier Transform) function in radars to obtain desired response characteristics within the range of the freedom of the filter (i.e., number N of filter stages).

Incidentally, the radar reception signal contains a signal reflected from the ground, buildings, etc. (referred to as stationary clutter), a signal reflected from rain droplets, clouds, etc. (referred to as moving clutter), a signal reflected from an aircraft (referred to as target or desired signal) and a noise signal. The stationary clutter has a Doppler spectrum centered on zero Doppler frequency. The moving clutter and desired signals respectively cover a wide range of frequencies about the zero Doppler frequency.

Doppler spectra of these signals are exemplified in FIG. 2 where 200 represents a stationary clutter spectrum, 210 a moving clutter spectrum, and 220 a spectrum of the desired signal. The stationary and moving clutters (both being simply referred to as clutter) and the noise signal stand for undesired signals in the radar reception signal and generally, the former is a more intensive than the latter.

Therefore, a filter characteristic is desired, which can sufficiently suppress the undesired signal attributable to the clutter region to maximize the degree of S/C improvement (i.e., the degree of input/output improvement in the ratio of the desired signal to the clutter). More specifically, since a signal representative of the stationary clutter attributable to the stationary clutter region is strong, it is necessary for the filter to have, for the purpose of suppressing the stationary clutter signal, a filter characteristic which has null filtering at the zero frequency point and has sufficiently low side lobe levels in the neighborhood of the zero frequency so that sufficient suppression can be obtained. For the moving clutter region, since the moving clutter prevails over a wide range, it is necessary to provide a uniformly low side lobe characteristic. For a region where there is only a noise signal (i.e., clear region), a filter characteristic is desired which maximize the S/N improvement degree (i.e., the degree of input/output improvement in the ratio of the desired signal to the noise), and hence a DFT filter is requireed.

In the prior art digital filter, however, the filter coefficient has been fixed, and the filter has an MTI cancellation function, a DFT function, a digital filtering function or a function of MTI cancellation and digital filtering in combination. The MTI cancellation is effective for the stationary clutter region but is not suited to a composite clutter region covering both the stationary clutter and moving clutter. The DFT is best suited to the clear region with the maximum S/N improvement degree. However, the DFT fails to provide necessary suppression for the stationary and moving clutter regions since the side lobe is high in these regions. The combination of the MTI cancellation and digital filtering is effective for the stationary and moving clutter regions, but is not suited for the clear region since the maximum S/N improvement degree cannot be obtained. In the case of the digital filters, the filter characteristic can be so determined as to be suited for the stationary clutter region, moving clutter region and clear region, but the optimum filter characteristic is not the same in the individual regions. As has been explained, the prior art digital filter, because of its fixed filter coefficent, is not suited for some regions although suited for the other regions.

SUMMARY OF THE INVENTION

An object of the invention is to provide an adaptive radar signal processing apparatus for a radar system capable of providing suppression of undesired signals which is adapted for each of the stationary clutter region, moving clutter region and clear region.

According to the invention, there is provided an adaptive radar signal processing apparatus for a radar system, which comprises: a memory unit including a plurality of memories having a predetermined memory capacity, an input signal to the appratus being successively stored in the plurality of memories and necessary signals being read out of the memories; a weighting unit for applying a weight to each of the read-out signals in one-to-one correspondence; a region discriminator for discriminating two or more regions among a region concerning stationary objects such as ground and building, a region concerning moving objects such as droplets of rain and clouds, a region concerning neither the stationary objects nor the moving objects, according to an input signal to the region discriminator; a control signal generator responsive to an output of the region discriminator, for generating a control signal for controlling the weight application for each region; and a weight coefficient generator having weight coefficients for the respective regions, the weight coefficients being switched according to a control signal from the control signal generator, thereby permitting suppression of undesired signals to be adapted for the individual regions.

DETAILED DESCRIPTION OF PREFERRED EMBODIMENT

Figure 1:
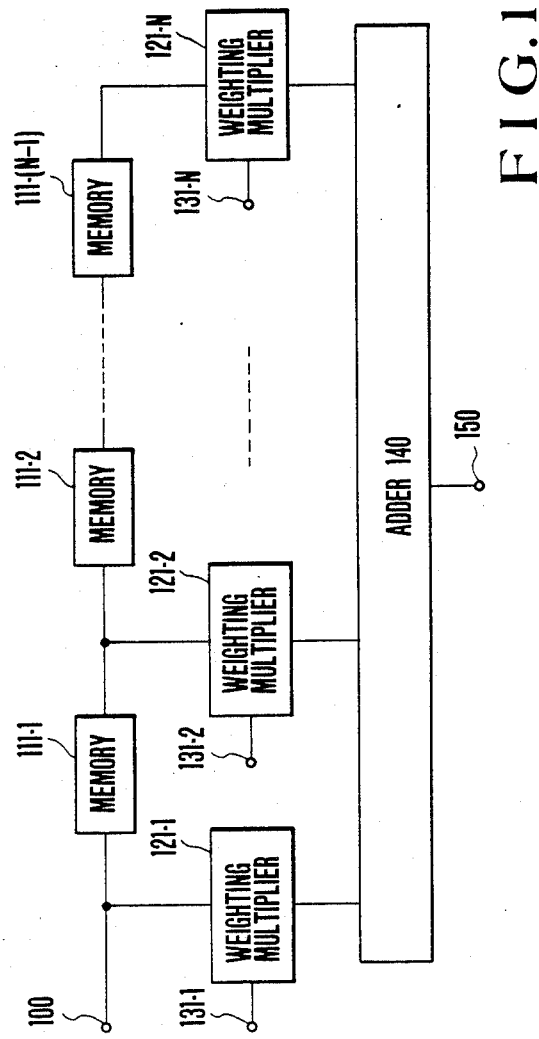
FIG. 1 is a block diagram showing a prior art digital filter of fixed filter coefficient type.
Figure 2:
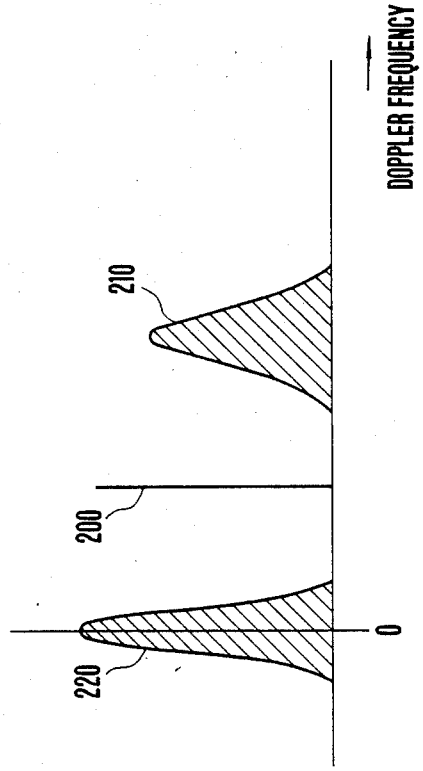
FIG. 2 is a graph showing Doppler spreads of stationary clutter, moving clutter and desired signal.
Figure 3:
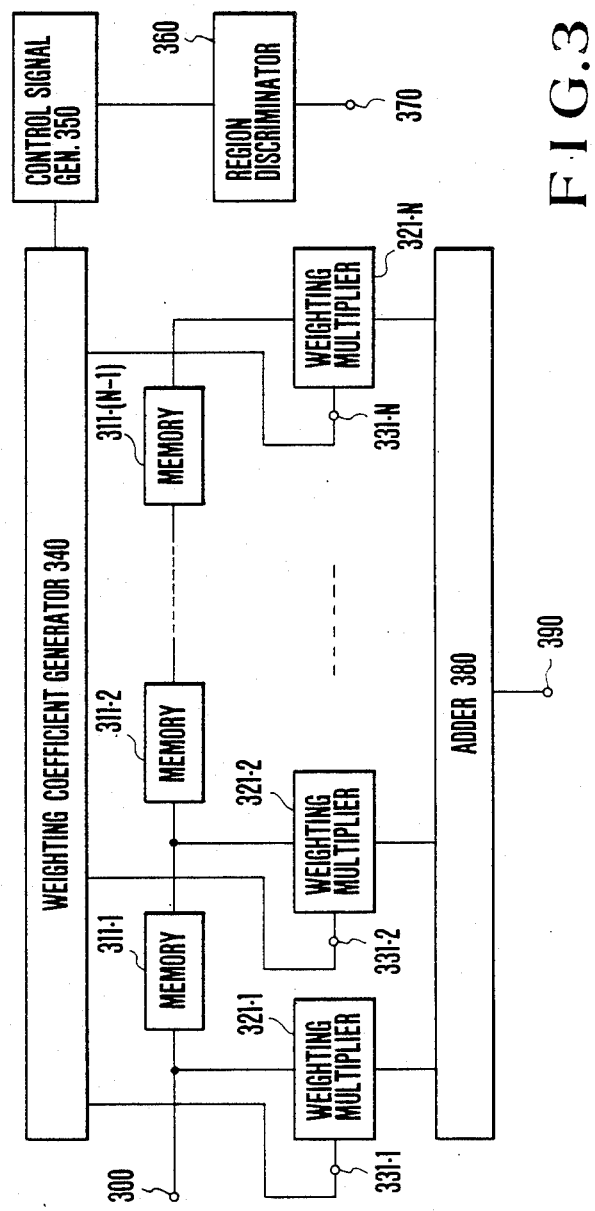
FIG. 3 is a block diagram showing an embodiment of the invention.

Now, an embodiment of the invention will be described with reference to the drawings. FIG. 3 shows the construction of the embodiment. The illustrated embodiment comprises first to $(N-1)$-th sweep memories 311-1 to 311-$(N-1)$, weighting multipliers (weight applying units) 321-1 to 321-N, a weight coefficient generator 340, a control signal generator 350, a region discriminator 360, and an adder 380. Each of the sweep memories 311-1 to 311-$(N-1)$ has a memory capacity in excess of the number of data pieces per one transmission pulse multiplied by the amplitude bit number. An input terminal 300 for reception of a complex signal is connected to the first sweep memory 311-1. The second sweep memory 311-2 and weight applying unit 321-2 are connected to the first sweep memory 311-1, and the other sweep memories and weight applying units are connected similarly. The weight coefficient generator 340 provides a weighting coefficient (i.e., a filter coefficient determining the filter characteristic) corresponding to each region to respective weight coefficient input terminals 331-1 to 331-N of each of the weight applying units 321-1 to 321-N. The control signal generator 350 generates a weight coefficient switching signal to the weight coefficient generator 340. The region discriminator 360 discriminates a region in accordance with an input signal supplied to its input signal terminal 370. The adder 380 adds together the output signals of the individual weight applyibg units 321-1 to 321-N. An output terminal 390 is connected to the adder 380.

To obtain the input signal to the input signal terminal 370 of the region discriminator 360, the input signal to the apparatus input terminal 300 is subjected to a predetermined processing by a circuit (not shown) and applied to the terminal 370. Alternatively, the input signal to the terminal 300 may be directly coupled to the terminal 370 and subjected to the predetermined processing within the region discriminator 360.

The above construction of the embodiment of the invention effects the switching of filter characteristics as follows. The control signal generator 350 controls the weight coefficent generator 340 for the switchng of the filter coefficients such that an optimum filter characteristic is provided for each region according to a region discrimination signal generated from the region discriminator 360 (representing either the stationary clutter region, moving clutter region, or clear region). For the stationary clutter region, the filter coefficient is selected such as to provide the combination of the MTI cancellation and digital filtering, thereby ensuring that the high intensity stationary clutter can be suppressed sufficiently. For the moving clutter region, the filter coefficient is selected such as to provide a low side lobe charactristic. For clear region, the filter coefficient selection is done such as to provide a DFT function for maximizing the S/N ratio. For the composite region covering the stationary clutter and moving clutter, the filter coefficient is selected to provide the combination of the MTI cancellation and digital filtering.

Figure 4A:
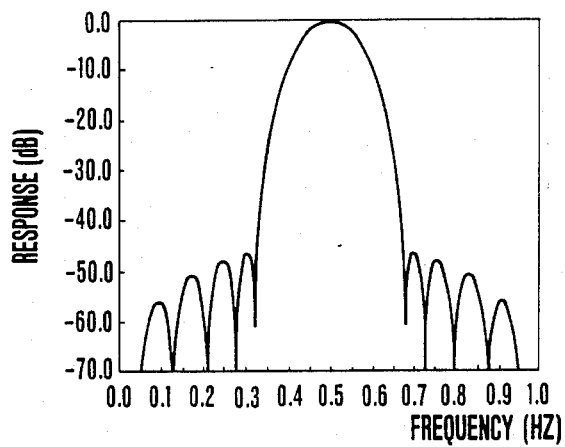
FIGS. 4A to 4C show examples of the digital filter characteristic.
Figure 4B:
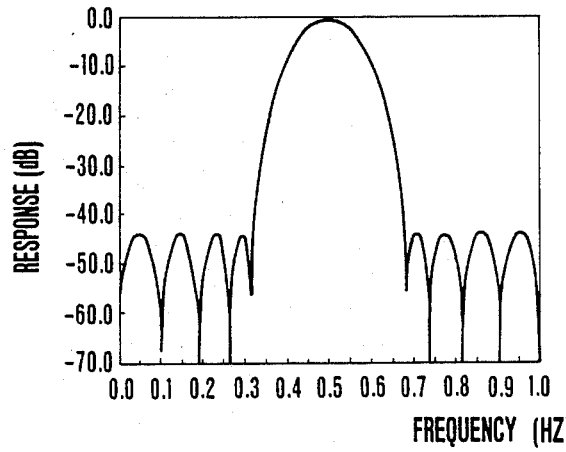
Figure 4C:
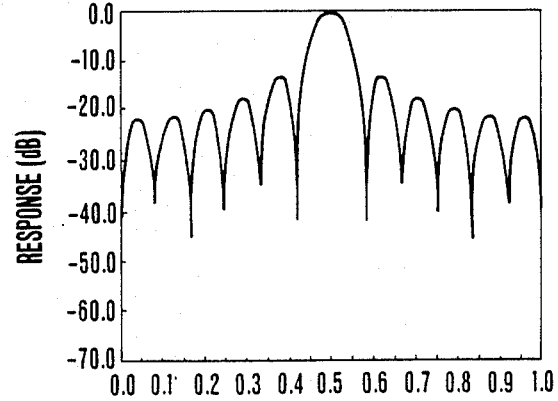

FIGS. 4A to 4C show examples of the digital filter characteristic. Specifically, FIG. 4A shows the charactristic of the combination of the MTI cancellation and digital filtering. FIG. 4B shows the charactristic of the low side lobe digital filter. FIG. 4C shows the charactristic of the DFT digital filtering.

As has been described, according to the radar signal processing apparatus of the invention, optimum filter charactristics can be obtained for the individual stationary clutter region, moving clutter region, clear region, etc., thereby ensuring that the undesired signals can be effectively suppressed and satisfactory detection of targets can be accomplished.

What is claimed is:

1. An adaptive radar signal processing apparatus for a radar system comprising:
   a memory unit including a plurality of memories having a predetermined memory capacity, an input signal to the apparatus being successively stored in said plurality of memories and signals being read out of said memories;
   a weighting unit connected to said plurality of memories for applying a weight to each of the read-out signals in one-to-one correspondence;
   a region discriminator for discriminating two or more regions among a region having stationary objects such as ground and buildings, a region having moving objects such as droplets of rain and clouds, and a clear region having neither said stationary objects nor said moving objects, according to an input signal to said region discriminator;
   a control signal generator responsive to an output of said region discriminator, for generating a control signal for controlling the weight application of said weighting unit for each region; and
   a weight coefficient generator connected to said control signal generator and said weighting unit and having weight coefficients for said respective regions, said weight coefficients being switched according to said control signal from said control signal generator, thereby permitting suppression of undesired signals to be adapted for the individual regions.

2. An adaptive radar signal processing apparatus according to claim 1 further comprising an adder for adding together outputs of the respective weighting units to produce an output signal of said apparatus.

3. An adaptive radar signal processing apparatus according to claim 1, wherein said weight coefficient generator switches to adjust the weights of said weighting units to provide variable bandwidth and side lobe levels such as to provide a combination of MTI cancellation and digital filtering for said stationary object region, to provide low side lobe characteristics for said moving object region and to provide a DFT function for said clear region.

* * * * *